United States Patent [19]

Wolf

[11] 4,375,944

[45] Mar. 8, 1983

[54] LUBRICATING DEVICE FOR A MOTOR COMPRESSOR

[75] Inventor: Rudolf H. Wolf, Adrian, Mich.

[73] Assignee: Tecumseh Products Company, Tecumseh, Mich.

[21] Appl. No.: 892,657

[22] Filed: Apr. 3, 1978

Related U.S. Application Data

[63] Continuation-in-part of Ser. No. 722,641, Sep. 13, 1976, Pat. No. 4,097,185.

[51] Int. Cl.³ .............................................. F04B 39/02
[52] U.S. Cl. .................... 417/368; 184/6.16; 415/88; 415/91; 417/372
[58] Field of Search ............ 417/368, 372, 902; 184/6.16, 6.18; 415/88, 89, 91

[56] References Cited

U.S. PATENT DOCUMENTS

| | | | |
|---|---|---|---|
| 3,135,213 | 6/1964 | Smith et al. | 417/368 |
| 3,181,796 | 5/1965 | Keller | 415/88 X |
| 3,410,478 | 11/1968 | Geisenhaver | 417/902 X |
| 3,560,117 | 2/1971 | Valbjorn | 417/372 |

FOREIGN PATENT DOCUMENTS 577472 6/1959 Canada ............................. 417/368
1303435 11/1975 Fed. Rep. of Germany ..... 184/6.16

Primary Examiner—Leonard E. Smith
Attorney, Agent, or Firm—Albert L. Jeffers; John F. Hoffman

[57] ABSTRACT

A lubricating device, especially for use with a hermetic motor compressor unit, having a vertical shaft extending downwardly into a lubricant sump. The lubricating device comprises a pick-up tube having a larger diameter upper cylindrical portion open at the upper end thereof and adapted for being fitted into a central bore in the shaft, a smaller diameter lower cylindrical portion adapted to be immersed in fluid in the sump, a tapering transition region connecting the upper and lower cylindrical portions, an inlet port extending axially into the lower end of the lower portion, and the pair of diametrally opposite ribs on the lower cylindrical portion comprising ridges on the inner surface and corresponding hollows on the outer surface thereof.

3 Claims, 5 Drawing Figures

LUBRICATING DEVICE FOR A MOTOR COMPRESSOR

CROSS REFERENCE TO RELATED APPLICATIONS

This is a continuation-in-part of application Ser. No. 722,641 filed Sept. 13, 1976, now U.S. Pat. No. 4,097,185.

BACKGROUND OF THE INVENTION

The present invention relates to centrifugal lubricant pick-up tube especially of the type suitable for use with hermetic motor compressor units.

In sealed units, such as hermetic motor compressor units, the proper lubrication of bearing regions is highly critical because the regions are not accessible for lubricants supplied thereto from outside the unit.

A known arrangement for supplying lubricant to bearing regions and hermetic units of the nature referred to involves the use of a pick-up tube which has one end immersed in a lubricant sump. The tube is mounted in the shaft of the unit and exerts a pumping action on the lubricant which flows through the lower open end of the tube. The tube is effective for propelling the lubricant upwardly and, via suitable passage means in the shaft, to the bearing regions to be lubricated.

Such pick-up tubes are disclosed, for example, in U.S. Pat. Nos. 2,287,203, 3,125,184, 3,187,994, 3,194,490 and 3,410,478. The present invention is particularly concerned with improvement in the pick-up tube disclosed in the aforementioned copending application Ser. No. 722,641, filed Sept. 13, 1976. In the pick-up tube disclosed in that application, a diametrally disposed impeller blade was provided inside the lower cylindrical portion.

SUMMARY OF THE INVENTION

In the present invention, the impeller blade shown in application Ser. No. 722,641 filed Sept. 13, 1976 has been replaced by a pair of longitudinally extending ribs formed on the inner surface of the lower cylindrical portion. This results in a pick-up tube which is more economical to manufacture and is less prone to failure since there is no impeller blade which may be dislodged. Furthermore, the present tube is less likely to become clogged by a foreign object.

The present invention relates to a pick-up tube, especially for use for supplying lubricant to a lubricant passage in a hermetic device which includes a fluid sump and a vertically disposed rotary shaft above the fluid level in the sump, said tube comprising: a larger diameter cylindrical portion open at the upper end and adapted for being fitted into a central bore in the shaft, said tube having a smaller diameter lower cylindrical portion adapted to be immersed in fluid in the sump, a tapering axial region connecting the upper and lower cylindrical portions, an inlet port extending axially into the lower end of the lower cylindrical portion, and a pair of diametrally opposite ribs on the lower cylindrical portion inner surface, said ribs extending longitudinally on said lower cylindrical portion.

The lower end of the lower portion is provided with a central inlet opening, smaller in diameter than the reduced diameter lower portion. The reduced diameter portion of the pick-up tube is selected so that cavitation does not occur in the lubricant flowing to the lower end of the pick-up tube and which will be set into rotation, not only by engagement thereof by the rotating pick-up tube, but also by the inverted ribs.

The tapered region of the pick-up tube is at least partially below the liquid level in the lubricant sump so that fluid within the pick-up tube will flow outwardly and upwardly along the tapered region, and this action will cause the fluid to climb upwardly in the pick-up tube and out the top thereof and on upwardly through the passage means provided therefor in the shaft in which the pick-up tube is mounted.

The longitudinal ribs dramatically increase the output of the pump by reducing the slippage between the oil film and the inner surface of the tube. By this means, tangential motion is imparted to the lubricant whereupon it is forced upwardly through the tube.

DETAILED DESCRIPTION

Figure 1:
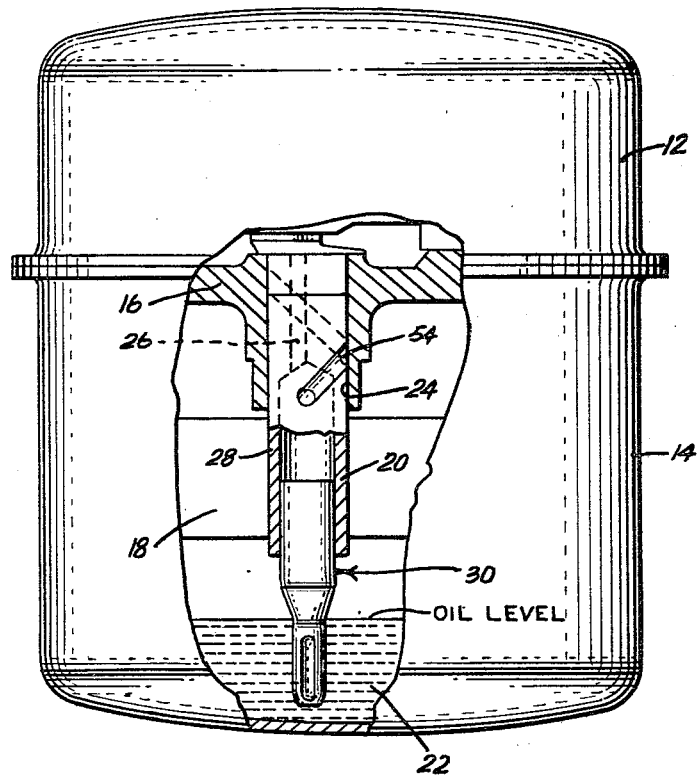
FIG. 1 is a schematic view, partially broken away, of a sealed motor compressor unit incorporating the pick-up tube of the present invention.
Figure 2:
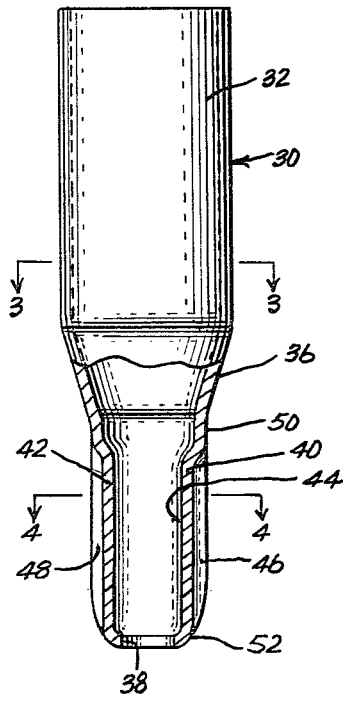
FIG. 2 is a side elevational view, partially broken away, showing the pick-up tube according to the present invention.
Figure 3:
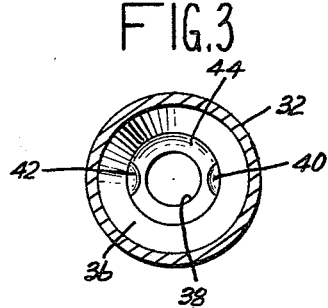
FIG. 3 is a sectional view taken along line 3—3 of FIG. 2.
Figure 4:
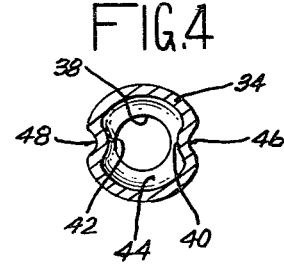
FIG. 4 is a sectional view taken along line 4—4 of FIG. 2.
Figure 5:
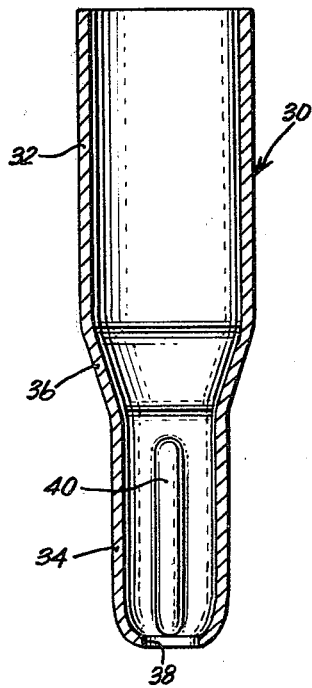
FIG. 5 is a longitudinal sectional view of the pick-up tube with the tube rotated 90 degrees on its longitudinal axis from the position shown in FIG. 2.

Referring to the drawings in detail, the hermetic motor compressor unit 10 illustrated in FIG. 1 comprises an outer casing having upper and lower parts 12 and 14, and a cast frame 16, the upper end of which embodies the compressor proper, which may be of a piston-cylinder type. At the lower end of the cast frame 16, is located a motor having a rotor 18 connected to a shaft 20, which is the shaft through which power is supplied to the compressor.

At the bottom of the lower casing part 14 is contained liquid 22 comprising a refrigerant fluid and a lubricating fluid. It is this fluid which is desired to propel upwardly at least to bearing region 24 for shaft 20 and preferably on upwardly and out the upper end of shaft 20 in a region (not illustrated) via passageway 26 in shaft 20 which leads from the upper end of bore 28 in the lower end of shaft 20 to the upper end of shaft 20. Passageway 26 is preferably offset laterally from the axis of shaft 20.

Pick-up tube 30 according to the present invention is press fitted in the lower end of shaft 20 and has a lower end portion dipping into fluid 22 in the sump. Pick-up tube 30, shown in detail in FIGS. 2, 3, 4 and 5, has a cylindrical upper portion 32 of larger diameter, a cylindrical lower portion 34 of a smaller diameter, and a transition region 36 tapering upwardly in the outer direction and connecting the upper and lower portions 32 and 34. The upper end of upper portion 32 is open, and the lower end of lower portion 34 is provided with an inlet port 38 which is smaller in diameter than lower portion 34.

According to the present invention, a pair of diametrally opposite ribs 40 and 42 are formed in lower cylindrical portion 34. Ribs 40 and 42 extend from near inlet port 38 to near the juncture of lower cylindrical portion 34 and the transition portion 36. Ribs 40 and 42 comprise ridges on the inner surface 44 of lower portion of 34 and corresponding hollows 46 and 48 on the outer surface 50 of portion 34. The vertical ribs 40 and 42 are formed in lower portion 34 by either die or ball bearing methods. It will be noted that the lower end of lower portion 34 comprises an arcuate nose portion 52 in which inlet 38 is formed.

As shown in FIG. 1, pick-up tube 30 is immersed in the liquid 22 in the sump so that the liquid 22 is at least slightly above the aforementioned juncture between lower portion 34 and transition portion 36.

A pick-up tube 30 of the nature referred to is especially adapted for use with hermetic compressor units of the nature generally referred to having motors ranging in horsepower from about 1/20 hp. up to about ½ hp. Such motors can operate at shaft speeds of, for example, 3600 r.p.m. and the sump of the unit may contain an oil charge ranging from 13 oz. up to about 23 oz.

A pick-up tube according to the present invention may have dimensions in conformity with the following schedule which is submitted by way of example only:

Overall length of tube 30: 1.895 in.
Axial length of portion 32 Length: 0.771 in.
Outside diameter of portion 32: 0.560 in.
Inside diameter of portion 32: 0.497 in.
Axial length of portion 34: 0.740 in.
Outside diameter of portion 34: 0.365 in.
Diameter of inlet port 38: 0.162 in.
Outside radius of nose portion 52: 0.162 in.
Depth of hollows 46 and 48: 0.050 in.

Pick-up tube 30, when dimensioned as set forth above, has been found to avoid cavitation effects at normal operating speeds. Generally speaking, the axial length of portion 32 depends both upon the distance between the lower end of shaft 16 and the normal upper and lower limits of the oil level in the sump of the compressor, and it can be varied over a considerable range to accommodate such oil level variations.

The axial length of portion 34, however, should not be reduced much below three-quarters of an inch. The outside diameter of lower portion 34 can be dimensioned within limits determined by the diameter of inlet port 38, the angular velocity of the shaft, the type of liquid in which the tube is submerged and spins, and of the temperature and viscosity of the liquid as will be apparent to one skilled in the art from the disclosure herein.

Pick-up tube 30 may be mass produced economically in a progressive draw stamping operation from aluminum killed deep draw quality cold rolled steel. For example, to make a pick-up tube such as tube 30, sheet steel is die blanked into a circular disc and then progressively drawn first into a cup shape and then in three more draws into an elongated cylindrical tube of uniform diameter. In two more draws, portions 34 and 36 are formed, during which the overall length of the tube is increased to final dimension. Then the excess holding material is trimmed off the upper end of the tube, port 38 is pierced in the lower end of the tube, and a final swagging operation is performed which brings the tube to an accurate finished size. The tube may be provided with a copper flash finish, if desired.

Due to the cylindrical configuration of upper and lower portions 32 and 34 of tube 30, the same is relatively economical to produce in a draw process as compared to a conical tube having the same overall length and the same inlet and outlet orifice diameters.

Ribs 40 and 42 increase the output of the pump by reducing the slippage between the oil film and the inner surface of the tube, for example, by acting as an impeller element in the tube. Ribs 40 and 42 also tend to break up refrigerant bubbles in a heavily laden refrigerant-oil mixture thereby assisting the gas-liquid separating action which occurs within shaft 20 above tube 30.

As oil enters the inlet 38, it encounters the two ribs 40 and 42 which impart a tangential motion to the oil causing it to move by centrifugal force to the inside wall of the rotating tube 30. More oil enters the inlet 38 and is forced up until it enters the large diameter portion. The upwardly directed pressure on the oil occurs in two stages, the first being in the immediate vicinity of inlet port 38 due to the outward and upward inclination of the inner wall of nose portion 52, and the second being where the diameter of the tube again increases at the transition portion 36. The centrifugal force acting on the whirling oil is thus sufficient to pump a film of oil up the wall of tube 30 and through passageway 26 and groove 54 for distribution to the points of lubrication.

The body of fluid 22 surrounding the exterior surface of the submerged portions of tube 30 is also whirled by the skin friction of this surface on the adjacent fluid. However, due to the predetermined small diameter of portion 34 relative to portion 32, the surface speed of the external surface of portion 34 in the vicinity of inlet port 38 is slow enough to prevent cavitation of the liquid oil and refrigerant mixture in the vicinity of inlet port 38. If any cavitation does occur, it will occur further up tube 30, where it is sufficiently remote from inlet port 38 to prevent interruption of oil feed through inlet port 38.

From the drawings, it will be seen that ribs 40 and 42 provide for engagement of the oil-refrigerant mixture substantially as soon as the mixture enters the lower end of tube 30. Ribs 40 and 42 thus exert an immediate effect on the fluid to assist in the upward movement thereof along lower portion 34 toward the tapering transition portion 36.

It will be understood, that a baffle or impeller blade could be provided in upper cylindrical portion 32 as illustrated in prior U.S. Pat. No. 3,410,478. However, the ribs in the lower cylindrical portion 34 of tube 30 have proved to be highly effective substantially to increase the fluid pick-up as the tube rotates.

Modification may be made within the scope of the appended claims.

What is claimed is:

1. A drawn metallic pick-up tube, especially for use for supplying lubricant to a lubricant passage in a hermetic device which includes a fluid sump and a vertically disposed rotary shaft above the fluid level in the sump, said tube comprising: a large diameter upper cylindrical portion open at the upper end and adapted for being fitted into a central bore in the shaft, said tube having an open, smaller diameter lower cylindrical portion adapted to be immersed in fluid in the sump, said lower cylindrical portion having a generally cylindrical inner surface and an outer surface, a tapering transition portion connecting the upper and lower cylindrical portions, an inlet port extending axially into the lower end of said lower cylindrical portion, and a pair of diametrically opposite axial deformations in said lower cylindrical portion forming grooves on the outer surface and ribs with rounded contours on the inner surface.

2. A drawn, metallic pick-up tube, especially for use for supplying lubricant to a lubricant passage in a hermetic device which includes a fluid sump and a vertically disposed rotary shaft above the fluid level in the sump, said tube comprising: a large diameter upper cylindrical portion open at the upper end and adapted for being fitted into a central bore in the shaft, said tube having an open, smaller diameter lower cylindrical portion adapted to be immersed in fluid in the sump, said lower cylindrical portion having an inner surface and an outer surface, a tapering transition portion connecting the upper and lower cylindrical portions, an inlet port extending axially into the lower end of said lower cylindrical portion, said lower cylindrical portion inner surface having an upper section and a very short lower section contiguous with said upper section and said inlet port, said lower section tapering inwardly toward said inlet port, and a pair of diametrically opposite axial deformations in said lower cylindrical portion forming grooves on the outer surface and ribs with rounded contours on the inner surface thereof.

3. The pick-up tube of claim 2 wherein said ribs extend from near said inlet port to near the juncture of said lower cylindrical portion and said transition region.

* * * * *